(12) United States Patent  
Rodenbeck (10) Patent No.: US 8,997,954 B2
(45) Date of Patent: Apr. 7, 2015

(54) VARIABLE-ELASTOMER SEMI-ACTIVE DAMPING APPARATUS

(76) Inventor: Phillip D. Rodenbeck, Valparaiso, IN (US)

( * ) Notice: Subject to any disclaimer, the term of this patent is extended or adjusted under 35 U.S.C. 154(b) by 981 days.

(21) Appl. No.: 13/086,604

(22) Filed: Apr. 14, 2011

(65) Prior Publication Data

US 2012/0261869 A1    Oct. 18, 2012

(51) Int. Cl.
   *F16F 9/00*    (2006.01)
   *B60G 17/08*   (2006.01)
   *F16F 9/34*    (2006.01)
   *F16F 9/32*    (2006.01)

(52) U.S. Cl.
   CPC ............ *B60G 17/08* (2013.01); *B60G 2202/24* (2013.01); *F16F 9/3405* (2013.01); *F16F 9/3415* (2013.01); *F16F 9/3214* (2013.01)

(58) Field of Classification Search
   USPC .................. 188/316, 317, 319.1, 320, 322.22;
                         267/196, 201, 202, 219, 35, 134
   See application file for complete search history.

(56) References Cited

U.S. PATENT DOCUMENTS

| | | |
|---|---|---|
| 3,362,508 A | 1/1968 | Mayer |
| 3,625,321 A | 12/1971 | Lutz |
| 3,771,626 A | 11/1973 | Palmer |
| 4,154,461 A | 5/1979 | Schnittger |
| 4,265,305 A | 5/1981 | Stone et al. |
| 4,313,529 A | 2/1982 | Kato et al. |
| 4,333,668 A | 6/1982 | Hendrickson et al. |
| 4,468,050 A | 8/1984 | Woods et al. |
| 4,515,252 A | 5/1985 | Hidaka et al. |
| 4,598,929 A | 7/1986 | Kumagai et al. |
| 4,600,215 A | 7/1986 | Kuroki et al. |
| 4,620,619 A | 11/1986 | Emura et al. |
| 4,635,960 A | 1/1987 | Shirakuma |
| 4,679,811 A * | 7/1987 | Shuler .......................... 280/284 |
| 4,696,489 A | 9/1987 | Fujishiro et al. |
| 4,722,548 A | 2/1988 | Hamilton et al. |
| 4,754,855 A | 7/1988 | Kuwana et al. |
| 4,867,475 A | 9/1989 | Groves |
| 4,942,947 A | 7/1990 | Shtarkman |
| 5,070,972 A | 12/1991 | Dourson et al. |
| 5,074,389 A | 12/1991 | Slocum |
| 5,088,760 A | 2/1992 | Kakizaki et al. |
| 5,123,671 A | 6/1992 | Driessen et al. |
| 5,152,379 A | 10/1992 | Sackett et al. |
| 5,350,187 A | 9/1994 | Shinozaki |
| 5,360,089 A | 11/1994 | Nakamura et al. |
| 5,376,135 A | 12/1994 | Aulie |
| 5,396,973 A | 3/1995 | Schwemmer et al. |

(Continued)

*Primary Examiner* — Robert A Siconolfi
*Assistant Examiner* — Vu Q Nguyen
(74) *Attorney, Agent, or Firm* — Taft Stettinius & Hollister LLP; Daniel J. Krieger (57) ABSTRACT

A variable semi-active damping assembly comprising a shock body defining a fluid-filled chamber; a piston tube having a first end slidably disposed within the shock body; an inner rod slidably disposed within the piston tube and the shock body, the inner rod having a first end connected to a lower piston mount and a second end extending outward from the piston tube and engaging an adjustment mechanism that is configured to move the inner rod with respect to the shock body; an upper piston mount slidably disposed within the shock body and connected to the piston tube; and a deformable member disposed between the lower piston mount and the upper piston mount, the deformable member being configured to transition between a compressed state and a non-compressed state in response to movement by the lower piston mount.

9 Claims, 4 Drawing Sheets

(56) References Cited

U.S. PATENT DOCUMENTS

| | | |
|---|---|---|
| 5,398,788 A | 3/1995 | Lizell |
| 5,401,052 A | 3/1995 | Yoshioka et al. |
| 5,632,503 A | 5/1997 | Raad et al. |
| 5,702,298 A | 12/1997 | Conkling |
| 5,839,551 A | 11/1998 | Cesaraccio et al. |
| 5,848,675 A | 12/1998 | Gonzalez |
| 5,896,749 A | 4/1999 | Livers, Jr. |
| 5,911,290 A | 6/1999 | Steed |
| 5,988,330 A | 11/1999 | Morris |
| 6,293,377 B1 | 9/2001 | Okada et al. |
| 6,530,266 B1 | 3/2003 | Adderton et al. |
| 6,648,109 B2 | 11/2003 | Farr et al. |
| 6,810,720 B2 | 11/2004 | Adderton et al. |
| 6,879,898 B2 | 4/2005 | Ghoneim et al. |
| 6,994,332 B2 | 2/2006 | Goto et al. |
| 7,188,830 B2 | 3/2007 | Kato et al. |
| 7,255,335 B2 | 8/2007 | Muraoka et al. |
| 7,426,793 B2 | 9/2008 | Crary |
| 2005/0066714 A1 | 3/2005 | Adderton et al. |
| 2005/0275145 A1 | 12/2005 | Muraoka et al. |
| 2006/0001204 A1 | 1/2006 | Kato et al. |
| 2006/0219503 A1 | 10/2006 | Kim |
| 2007/0004553 A1 | 1/2007 | Oikawa et al. |
| 2007/0252375 A1 | 11/2007 | Roiser et al. |
| 2008/0116682 A1 | 5/2008 | Bestet et al. |
| 2009/0095584 A1* | 4/2009 | Kondo et al. .................. 188/267 |
| 2009/0148289 A1 | 6/2009 | Edenfeld |

\* cited by examiner

VARIABLE-ELASTOMER SEMI-ACTIVE DAMPING APPARATUS

TECHNICAL FIELD

The present invention generally relates to active, semi-active, adaptive, or variable vibration damping systems and more particularly to apparatuses and methods for managing the transmission of vibratory and impact forces between two interconnected components that move relative to one another.

BACKGROUND OF THE INVENTION

Conventional dampers, or shock absorbers, used in automotive and other vehicular suspension systems, provide passive vibration control with a constant damping coefficient. To achieve a passive damping force that accentuates the comfort of the vehicle's ride as opposed to its handling dynamics, a low damping force or "soft" setting is used. By contrast, to achieve a high damping force that accentuates the handling dynamics of the vehicle as opposed to its ride comfort, a high damping force or "hard" setting is used. The conventional design of dampers used to achieve these various handling characteristics generally include an outer cylinder or shock body that coaxially houses a slidable piston head and piston rod immersed in a damping fluid. In accordance with these embodiments, the piston rod exits through one end of the shock body, yet is closed and sealed at this location so that the inner shock body volume is divided into two fluid filled chambers. These fluid chambers are communicative through valving integrated into the piston structure, and as such, a shock absorber configured for "hard" damping has valving which provides a restricted flow path for fluid to communicate between chambers, while a shock absorber configured for "soft" damping has valving which provides a less restricted fluid flow path between chambers. The end of the piston rod extending outward from the shock body is equipped with a mounting apparatus for attachment to either the sprung or unsprung vehicle mass. Likewise, the end of the shock body opposite the exit of the piston rod is equipped with a mounting apparatus for attachment to the vehicle mass, sprung or unsprung, which is not attached to the piston rod.

Semi-active damping systems are used to mitigate the tradeoff characteristics associated with passive dampers. A semi-active damper can vary its damping force across a force range in order to provide "hard" and "soft" damping responses dependent on a variety of driving scenarios. In typical vehicle operating conditions, imperfections in the driving surface induce small displacement, high frequency vibrations that are best damped with a "soft" damping coefficient capable of minimizing the transmission of vibration to the vehicle operator. However, during rapid driving maneuvers, as such would be experienced in panic or racing scenarios, it is desirable to have a "hard" damping coefficient which will minimize the roll and pitch of the vehicle body, consequently improving vehicle control. The performance quality of a semi-active damper is largely dependent on the magnitude of its damping force range and the rate at which it can transition between different damping forces.

A number of semi-active damping methods have been developed to maximize the two aforementioned performance measures. Several previous systems have employed the use of a rotary valve, capable of restricting or unrestricting flow paths between the fluid chambers. Other systems have employed the use of multiple pistons disposed within the shock body, those pistons being equipped with valve assemblies capable of biasing load magnitudes between one another and being dependent on compression or rebound travel and other input driving conditions. These valve assemblies are often driven with stepper motors. Other systems choose to increase or decrease fluid restriction at the orifice of the piston flow path. Semi-active damping by this method is often accomplished with an actuated disk valve or other orifice adjuster that controls the geometry of the cross-sectional orifice profile. In accordance with other systems, the walls of the outer cylinder are adjustably deformed to alter the volume and pressure of the working fluid chambers that directly influence damping characteristics. Still other methods of semi-active damping teach away from fluid flow path variation and choose to directly vary the fluid properties instead. Such semi-active damping methods often employ a magnetorheological oil as the working fluid and an electromagnet housed within the piston which is capable of altering the fluid properties of the oil, particularly shear stress, in response to the magnitude of the generated magnetic field.

Deformable membranes, rubbers, and elastomers have also been used as key structures to certain semi-active damping methods. One such method employs a passive rubber elastic body to readily absorb high frequency, low displacement vibration while a separate oscillation plate is actively actuated to best handle large displacement vibration and to vary the overall damping coefficient of the semi-active damping apparatus. Yet another method teaches semi-active damping through the use of a gas-filled, flexible membrane sandwiched between two axially spaced pistons on the same piston rod. As the piston rod moves during rebound or compression strokes, compressed gas pumped into the flexible membrane engages the fluid in a pressure-transmitting manner by means of the membrane wall. Thus, a highly pressurized flexible membrane will absorb minimal pressure from the working fluid and will only deform in small amounts, resulting in a high internal pressure within the shock body and a correspondingly high damping force. In the alternative, some systems teach that the flexible membrane may be less pressurized, so as to deform during fluid interaction, reducing the overall internal pressure, and producing a low damping force. In either case, both systems teach that at no point should the flexible membrane be exposed to frictional contact with the inner cylinder walls.

The present invention is intended to improve upon and resolve some of the known deficiencies associated with the various conventional systems discussed above.

SUMMARY OF THE INVENTION

In accordance with one aspect of the present invention, a variable damping apparatus having a damping force control mechanism that employs both fluid flow path restriction and variable Coulomb damping in order to vary damping force levels between high and low settings is provided. In accordance with this embodiment, the apparatus comprises an elastically deformable elastomer member that is housed between upper and lower piston mounts, all of which are aligned coaxially and disposed within a shock tube. The elastomer member contains internal fluid channels that align with corresponding fluid channels that are present in the upper and lower piston mounts, thereby collectively forming uninterrupted communicative fluid pathways between the upper and lower working chambers of the fluid filled shock body. The lower piston mount is capable of movement along the general axis relative to the upper piston mount, and movement of the lower piston mount is accomplished with a threaded rod and adjustment mechanism or nut system that is actuated by an electric motor of the DC or servo type. Thus, the lower piston mount can move towards the upper piston mount, thereby reducing the axial distance between, and forcing the sandwiched elastomer member into a compressed state in which it will radially deform outwards, towards the inner wall of the shock tube. In this compressed state, the internal fluid channels of the elastomer experiences a reduction in cross-sectional area, thereby increasing the flow resistance through the overall fluid pathway. Furthermore, the available volume by which fluid passes along the outer walls of the elastomer member is capable of being greatly reduced as it expands outward, again resulting in an increase in fluid flow restriction. Furthermore, when the elastomer is greatly compressed, as in a driving scenario where the highest available damping forces are required, the outer wall of the elastomer is able to make physical contact with the inner wall of the shock tube, thereby inducing a large amount of Coulomb friction, and greatly increasing the damping force. By the same actuated thread-and-nut control method, the lower piston mount may be moved away from the upper piston mount, thereby increasing the axial distance between, and allowing for the elastomer to revert to its uncompressed state in which soft damping levels are achieved.

In accordance with other aspects of the present invention, the variable damping apparatus utilizes an actuated, deformable elastomer member that is integrated into a general piston assembly capable of varying fluid flow path restriction and inducing contact, or Coulomb friction, with the inner wall of the shock tube as a combined approach to controlling the overall damping force of the semi-active damping apparatus.

In accordance with certain embodiments of the present invention, the deformable elastomer can be coaxially sandwiched between upper and lower piston mounts which are capable of relative motion, while in still further embodiments the relative motion between upper and lower piston mounts is controlled by using a threaded rod and adjustment mechanism or nut assembly which can be actuated by an electric motor.

In accordance with one specific aspect of the present invention, a variable damper comprises a shock body defining an interior, fluid-filled chamber; a first mounting member connected to the exterior of the shock body; a piston tube which passes through a concentric seal integrated into the exterior of the shock body and has one end slidably disposed within the shock body and has a second end which connects to a second mounting member; an inner rod which concentrically passes through bearing members and seal members housed within the piston tube and is slidably disposed within the piston tube and the shock body and has one end which terminates at a connection with an inner rod mount which is connected to a lower piston mount, both elements being slidably and concentrically housed within the shock body, and a second end which extends outward of the piston tube and is engaged with an adjustment mechanism; an upper piston mount which is connected to the piston tube and slidably and concentrically housed within the shock body; a deformable elastomer which is sandwiched between the lower piston mount and the upper piston mount such that the fluid channels which permeate through the lower piston mount, the deformable elastomer, and the upper piston mount all circumferentially align when transitioning between the aforesaid elements and such that the deformable elastomer, when compressed by the lower piston mount and the upper piston mount, may expand radially outward in such a way that the volume between the deformable elastomer and the interior wall of the shock body is reduced, up to and including full contact between the deformable elastomer and the shock body; and a motor system which drives the adjustment mechanism which, in turn, axially moves the inner rod further into or further out of the shock body which moves the inner rod mount and the lower piston mount, being rigidly connected to the inner rod, in the same manner as the inner rod, which expands or compresses the deformable elastomer. In accordance with certain embodiments, the motor system may receive operative instructions from a data input system.

According to another aspect of the present invention, a variable semi-active damping assembly is provided. In accordance with this aspect of the invention, the assembly comprises a shock body defining a fluid-filled chamber; a piston tube having a first end slidably disposed within the shock body; an inner rod slidably disposed within the piston tube and the shock body, the inner rod having a first end connected to a lower piston mount and a second end extending outward from the piston tube and engaging an adjustment mechanism that is configured to move the inner rod with respect to the shock body; an upper piston mount slidably disposed within the shock body and connected to the piston tube; and a deformable member disposed between the lower piston mount and the upper piston mount, the deformable member being configured to transition between a compressed state and a non-compressed state in response to movement by the lower piston mount.

In accordance with yet another aspect of the present invention, a variable semi-active damping assembly comprises a shock body having a first end and a second end and defining a fluid-filled chamber; a piston tube slidably disposed within the shock body; a first mounting member connected to the first end of the shock body; a second mounting member connected to the second end of the shock body; an inner rod slidably disposed within the piston tube and the shock body, the inner rod having a first end connected to a lower piston mount and a second end extending outward from the piston tube and engaging an adjustment mechanism that is configured to move the inner rod with respect to the shock body; an upper piston mount slidably disposed within the shock body and connected to the piston tube; a deformable elastomer material disposed between the lower piston mount and the upper piston mount, the deformable elastomer material being configured to transition between a compressed state and a non-compressed state in response to movement by the lower piston mount; and inner fluid channels which permeate through the lower piston mount, the deformable elastomer material and the upper piston mount thereby forming an uninterrupted communicative fluid pathway between upper and lower working chambers of the shock body.

In accordance with still another aspect of the present invention, a variable semi-active damping system comprises a shock body defining a fluid-filled chamber; a piston tube having a first end slidably disposed within the shock body; an inner rod slidably disposed within the piston tube and the shock body, the inner rod having a first end connected to a lower piston mount and a second end extending outward from the piston tube and engaging an adjustment mechanism that is configured to move the inner rod with respect to the shock body; an upper piston mount slidably disposed within the shock body and connected to the piston tube; a deformable elastomer material disposed between the lower piston mount and the upper piston mount, the deformable elastomer material being configured to transition between a compressed state and a non-compressed state in response to movement by the lower piston mount; inner fluid channels which permeate through the lower piston mount, the deformable elastomer material and the upper piston mount thereby forming an uninterrupted communicative fluid pathway within the fluid-filled chamber of the shock body; and an electric motor configured to apply torque to the adjustment mechanism such that it rotates while being held in a constant vertical and horizontal position.

Other objects and benefits of the invention will become apparent from the following written description along with the accompanying figures.

BRIEF DESCRIPTION OF THE DRAWINGS

The above-mentioned aspects of the present invention and the manner of obtaining them will become more apparent and the invention itself will be better understood by reference to the following description of the embodiments of the invention taken in conjunction with the accompanying drawings, wherein.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Unless defined otherwise, all technical and scientific terms used herein have the same meaning as commonly understood by one of ordinary skill in the art to which this invention belongs. Although any method and materials similar or equivalent to those described herein can be used in the practice or testing of the present invention, the specific methods and materials are now described.

All references mentioned hereunder are incorporated by reference in their entirety. Unless mentioned otherwise, the techniques employed or contemplated herein are standard methodologies well known to one of ordinary skill in the art and the materials, methods and examples are illustrative only and not intended to be limiting.

Figure 1:
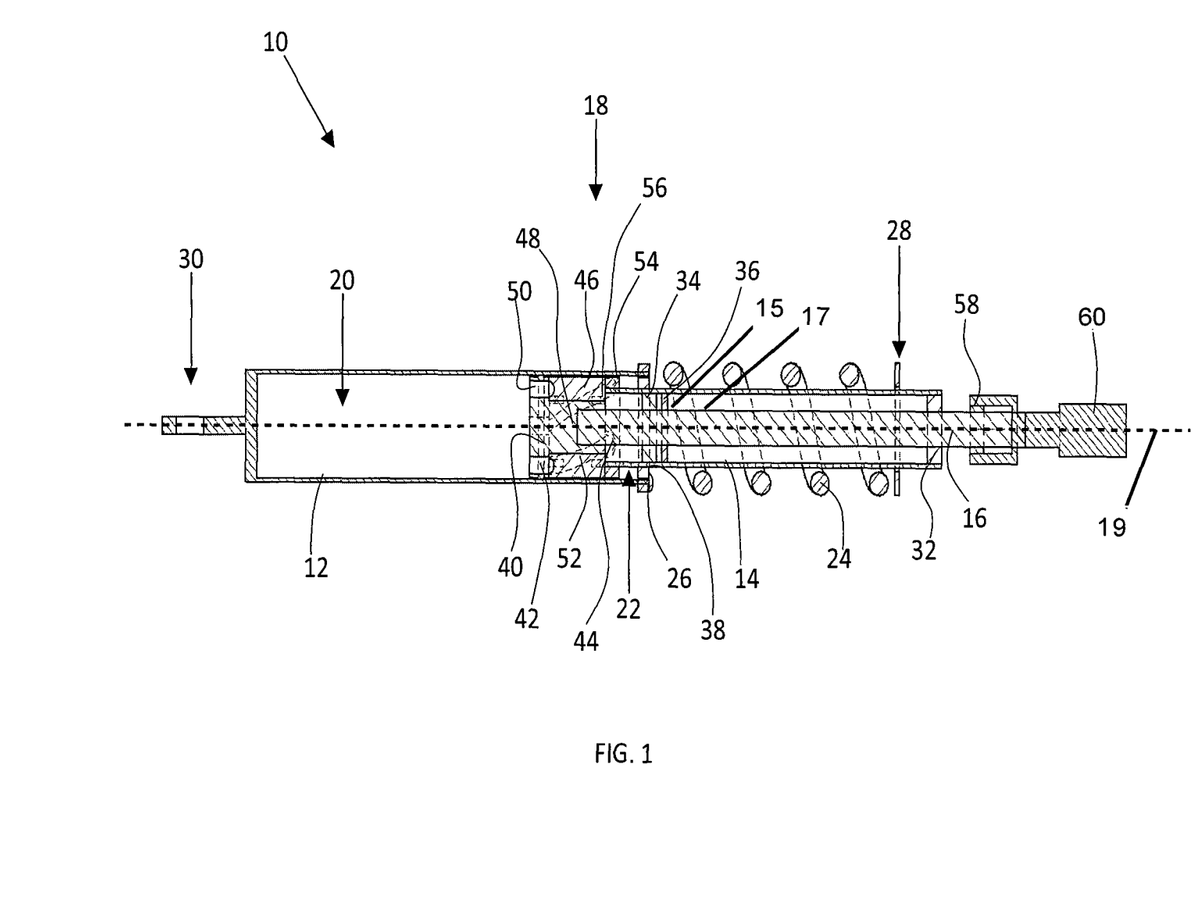
FIG. 1 is a cross-sectional side view of a variable elastomer semi-active damping apparatus in accordance with the teachings of the present invention.

The following detailed description, beginning with FIG. 1, illustrates a variable elastomer semi-active damper assembly 10. In accordance with one aspect of the present invention, the semi-active damper assembly 10 is constructed from a shock body 12 which is coaxially sealed to a piston tube 14. The piston tube 14 further has a coaxial inner rod 16 which passes through its center and connects to a semi-active piston assembly 18. The piston tube 14, inner rod 16, and semi-active piston assembly 18 are all slidably disposed within, or partially within, the shock body 12 and lie along its common lengthwise axis 19. Inside the shock body 12, the semi-active piston assembly 18 divides the internal volume of the shock body 12 into a compression working chamber 20 and a rebound working chamber 22. During compression of the semi-active damper, work is performed on the compression working chamber 20, which resists the relative movement of the semi-active piston assembly 18 within the shock body 12 and thereby damps the vibrational response from the compression input. The compression of the coil spring 24 during this movement produces a force which returns the semi-active piston assembly 18 back to its 'rest' position within the shock body 12. During this return movement, the rebound working chamber 22 has work performed on it which prevents the semi-active piston assembly 18 from rapidly snapping back to its 'rest' position, which would result in the transmission of an uncomfortable force to the vehicle operator. The coil spring 24 in the illustrated embodiment is housed between a lower spring seat 26 and the upper vehicle mounting point 28. It should be understood herein that this arrangement is not the only possible arrangement that may be used in accordance with the general teachings and principles of the present invention, particularly as different applications often call for different configurations of the damper and spring. Opposite the upper vehicle mounting point 28, the lower vehicle mounting point 30 is designed to connect to a wheel assembly or equivalent which receives vibrational inputs via displacement from the road or other driving surface on which the wheel is travelling.

A number of seals and bearings may be incorporated into the semi-active damper assembly 10 to ensure proper interaction of components. The bearings may be press-fit into the piston tube 14 and may be a double sealed ball-type. The seals may generally be press-fit into their respective cylinders and bi-directional, self-lubricating and spring-loaded. An upper bearing 32 connects the piston tube 14 to the inner rod 16, thereby ensuring coaxial alignment so that the inner rod 16 may rotate relative to the piston tube 14. Because a single connection point between the piston tube 14 and the inner rod 16 would allow for unwanted vibrational modes, the connection between the piston tube 14 and the inner rod 16 is further solidified by a lower bearing 34. Furthermore, a tube-to-rod seal 36 connects the inner wall 15 of the piston tube 14 to the outer wall 17 of the inner rod 16. The tube-to-rod seal 36 prevents the undesired transmission of any damping fluid through the inner volume of the piston tube 14. A body-to-tube seal 38 connects the inner wall 21 of the shock body 12 to the outer wall 23 of the piston tube 14, coaxially locating the piston tube 14 within the shock body 12 and ensuring that no undesired damping fluid housed within the rebound working chamber 22 leaks out to the external environment. A body-to-piston seal 40 connects the inner wall of the shock body 12 to the outer wall of the lower piston mount 42, which is a subcomponent of the semi-active piston assembly 18. Again, the purpose of the body-to-piston seal 40 is to coaxially locate the two components and to prevent unwanted fluid transmission, this time between the compression working chamber 20 and the rebound working chamber 22. However, the body-to-piston seal 40 will not be of the press-fit spring-loaded design ascribed to the aforementioned seals. Instead, the body-to-piston seal 40, in accordance with some embodiments of the present invention, may be rigidly attached to the outer wall of the lower piston mount 42 by a permanent epoxy or weld (or equivalent means). The deformable outer edge of the body-to-piston seal 40 will then radially extend from the connection point on the lower piston mount 42 to contact the inner wall of the shock body 12 in such a way that a desirable 'wiping' interaction is achieved. It should be understood and appreciated herein that those of ordinary skill in the art would understand this process as involving an interaction that prevents undesired fluid transmission while not significantly retarding the motion of the moving component. Due to this body-to-piston seal 40, damping fluid is not allowed to directly flow around the semi-active piston assembly 18 to communicate between the two chambers; rather, damping fluid must flow through the internal channels of the semi-active piston assembly 18 which allows for the variation of fluid flow restriction to occur. The methods and elements by which this variation of fluid flow restriction is achieved deviates from the methods and elements of conventional assemblies.

The semi-active piston assembly 18 is composed of three main components: a lower piston mount 42, an upper piston mount 44, and a deformable elastomer 46 coaxially sandwiched between the two mounts. In accordance with certain aspects of the present invention, the deformable elastomer 46 is composed of a deformable, resilient, rubbery material such as a polyurethane based elastomer or other such rubber elastomers, including, but are not limited to, polyether elastomers, poly(ether amide) elastomers, polyether polyester elastomers, polyamide-based elastomers, and mixtures thereof. In accordance with certain aspects of the present invention, the deformable elastomer 46 is cylindrical or conical in shape and has a smooth outer surface. In yet other aspects of the present invention, the deformable elastomer 46 is cylindrical or conical in shape and has a plurality of nubs, elastomeric projections, elastomeric rings and/or elastomeric columns extending radially outward from its outer cylindrical surface.

The geometry of the deformable elastomer 46 is central to the variation of Coulomb damping present in the variable elastomer semi-active damper assembly 10 and is therefore central to the performance of the variable elastomer semi-active damper assembly 10 across the range of its 'soft' to 'hard' operational modes. When the deformable elastomer 46 is compressed during operation, it will expand radially outward toward the inner wall of the shock body 12 with a radial deformation profile governed by its original, non-deformed geometry. The radial deformation profile of the deformable elastomer 46 will then govern how quickly frictional contact is initiated with the inner wall of the shock body 12 and how much surface area of the deformable elastomer 46 is involved in that contact. These factors consequently govern the damping response provided by the variable elastomer semi-active damper assembly 10 and the response communicated to the vehicle operator. If the geometry of the deformable elastomer 46 is purely cylindrical in its initial non-deformed state, then when compressed, it will assume a radial deformation profile having a bowed shape, consequently contacting the inner wall of the shock body 12 with a small ring of surface area in the midsection of the deformable elastomer 46 and increasing the surface area of that contacting ring as the compression of the deformable elastomer 46 is furthered. The ability to vary the surface area of the deformable elastomer 46 in contact with the inner wall of the shock body 12 allows for a more gradual transition between 'soft' and 'hard' damping states. If the geometry of the deformable elastomer 46 is varied, the manner in which the variable elastomer semi-active damper assembly 10 transitions from 'soft' to 'hard' damping states will vary as well. The ideal manner in which transition between 'soft' and 'hard' states occurs will vary based on application and therefore, the ideal deformable elastomer 46 geometry may vary between applications as well.

The upper piston mount 44 is rigidly attached to the piston tube 14. The lower piston mount 42 has a central column extending toward the upper piston mount 44, referred to as the inner rod mount 48, where the inner rod 16 axially mates into a hole drilled into the inner rod mount 48. The lower piston mount 42 has a number of lower fluid channels 50 which travel through its entirety, parallel to the general axis of the semi-active damper assembly 10. The inlets to the lower fluid channels 50 face the bottom end of the shock body 12 which is nearest the lower vehicle mounting point 30. The outlets to the lower fluid channels 50, which face toward the lower end of the deformable elastomer 46, concentrically mate with the inlets of the elastomer fluid channels 52. In accordance with certain embodiments, the elastomer fluid channels 52 travel through the length of the deformable elastomer 46 in a spiral pattern, each fluid channel completing a partial rotation around the general axis of the semi-active damper assembly 10. The outlets of the elastomer fluid channels 52, which face the lower end of the upper piston mount 44, then interface with the inlets of the upper fluid channels 54. The upper fluid channels 54 travel radially outward within the upper piston mount 44, the outlets of the upper fluid channels 54 being oriented perpendicular to the interior wall of the shock body 12. In this orientation of components, the lower fluid channels 50, the elastomer fluid channels 52, and the upper fluid channels 54 form one continuous fluid pathway by which damper fluid within the shock body 12 may communicate between the compression working chamber 20 and the rebound working chamber 22 to effectively dampen the transmission of vibrational force during input excitation. Ensuring the proper alignment of these fluid channels throughout the semi-active piston assembly 18 is useful for the proper functioning of the assembly 10. To maintain the desired alignment, several alignment pegs 56 protrude from the upper face of the lower piston mount 42 and from the lower face of the upper piston mount 44 and extend into the deformable elastomer 46.

In accordance with certain aspects of the present invention, the variable elastomer semi-active damper assembly 10 may further comprise an external reservoir. The external reservoir may be integrated in the usual way known to those having ordinary skill in the art, by connecting to the compression working chamber 20 via a bi-directional valve installed in the shock body 12 and a stainless steel braided hose which runs from the shock body valve to the external reservoir. There is a plurality of automotive suppliers who offer external reservoirs which may be utilized in this set up. If the application of the variable elastomer semi-active damper 10 necessitated an external reservoir, one of these aftermarket external reservoirs may be chosen and then the bi-directional valve to be installed in the shock body 12 would be sized accordingly. The typical applications which call for external reservoirs are heavy off-road use and racing use. An external reservoir reduces the need for a large compression working chamber 20 and rebound working chamber 22 within the shock body 12, therefore making the physical placement of the combined assembly more adaptable in tight spaces. Furthermore, an external reservoir increases the cooling of the damping fluid through increased surface area and the advantage of remote placement. Lastly, an external reservoir can provide increased pressure on the damping fluid, reducing the risk of foaming and improving the rate at which the damper responds to road inputs.

Figure 2:
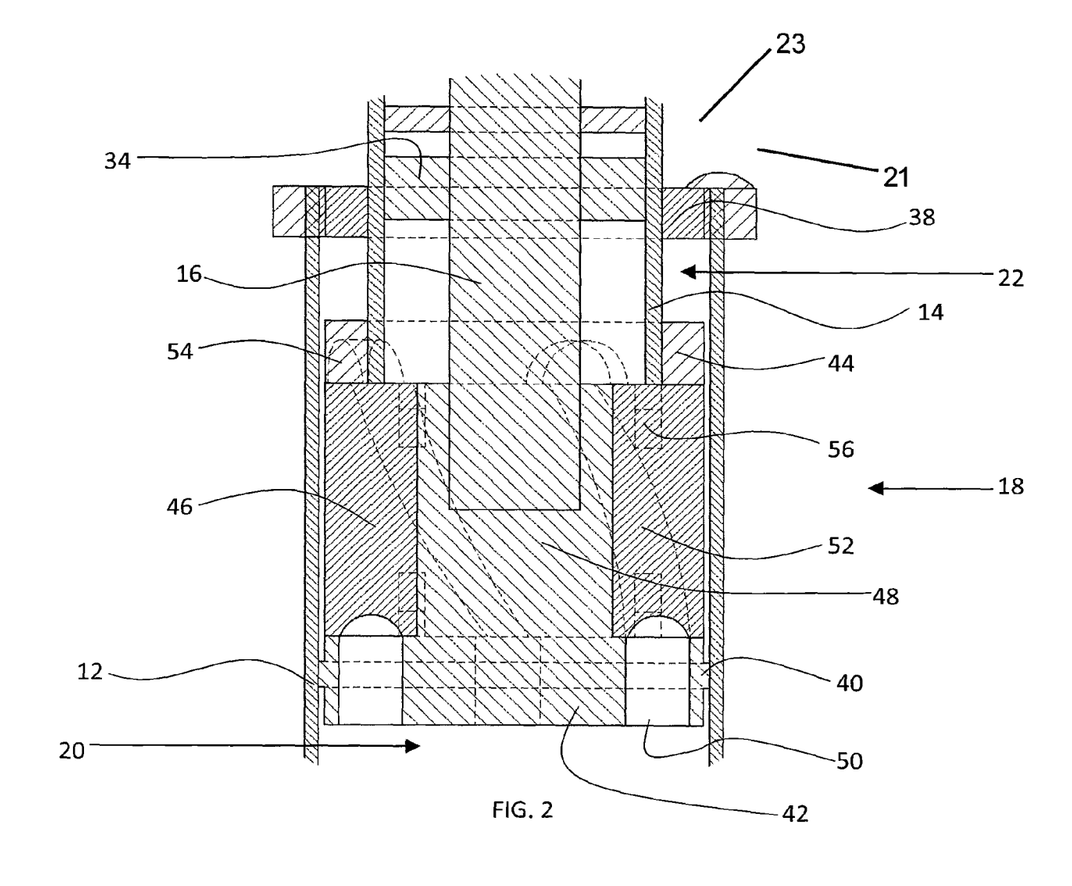
FIG. 2 is an enlarged cross-sectional side view of a variable elastomer piston assembly in an uncompressed or soft damping state in accordance with the teachings of the present invention.

The semi-active damper assembly 10 alters its damping characteristics from 'soft' to 'hard' damping by altering the geometry of the semi-active piston assembly 18. FIG. 2 illustrates the semi-active piston assembly 18 in its 'soft' damping state. The deformable elastomer 46 is in a relaxed, uncompressed state and is not making any contact with the inner wall 21 of the shock body 12. This configuration of components, shown in FIG. 2, will produce the baseline damping coefficient of the semi-active damper assembly 10, which is the lowest level of damping achievable.

Figure 3:
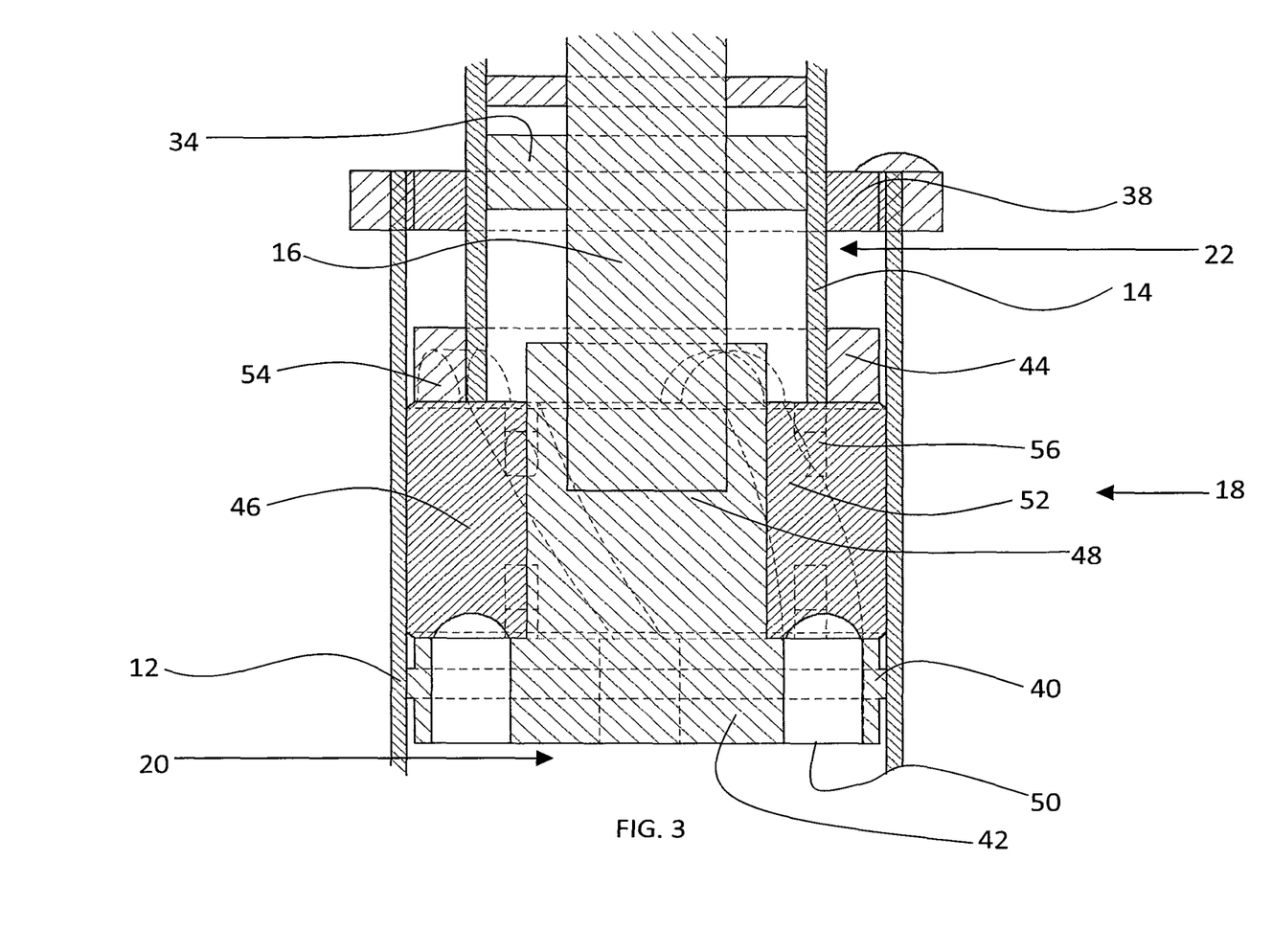
FIG. 3 is an enlarged cross-sectional side view of a variable elastomer piston assembly in a compressed or hard damping state in accordance with the teachings of the present invention.
Figure 4:
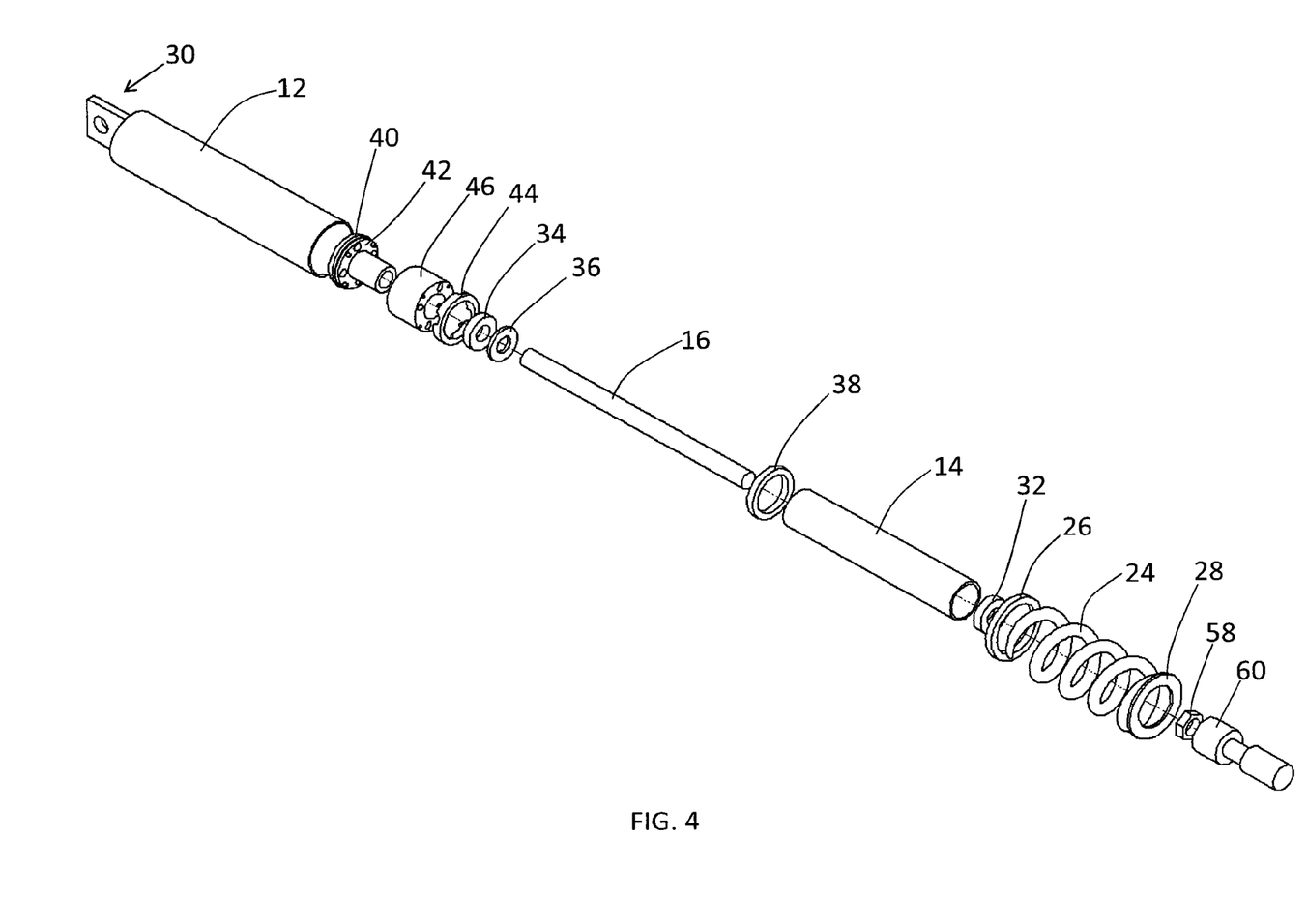
FIG. 4 is an exploded view along the common axis of a variable elastomer semi-active damping apparatus in accordance with the teachings of the present invention.

FIG. 3, contrastingly, illustrates a 'hard' damping state where the damping coefficient of the overall semi-active damper assembly 10 will be far greater than the damping coefficient which would be produced by the geometry illustrated in FIG. 2. In FIG. 3, the deformable elastomer 46 has been compressed by the relative upward movement of the lower piston mount 42 toward the upper piston mount 44. This movement is achieved by the rotation of the inner rod 16 by the electric motor 60. The electric motor 60 is attached to an adjustment mechanism 58 which, in turn, has a thread engagement with the protruding end of the inner rod 16 which extends outward from the upper face of the upper bearing 32. In accordance with certain aspects of the present invention, the adjustment mechanism 58 is a stationary threaded nut or tube in which the inner rod 16 threadably inserts and which the motor system 60 applies torque to, thereby causing axial movement of the inner rod 16. In accordance with other aspects of the present invention, the adjustment mechanism 58 is a rack and pinion system. Additional aspects of the present invention can be appreciated from FIG. 4, which shows an exploded view of the exemplary variable elastomer semi-active damper assembly 10 in accordance with the teachings of the present invention.

An illustrative description of the operation of the adjustment mechanism 58 in accordance with the present invention is now provided. Specifically, the electric motor 60 is configured to apply a torque to the adjustment mechanism 58 such that it rotates while being held in a constant vertical and horizontal position. As such, the thread engagement between the adjustment mechanism 58 and the inner rod 16 causes the inner rod 16 to move upward, toward the electric motor 60. Smooth and straight rotation of the inner rod 16 is achieved through the upper bearing 32 and the lower bearing 34. The bottom end of the inner rod 16, opposite the end of the inner rod 16 which engages with the adjustment mechanism 58, inserts into and rigidly attaches to the inner rod mount 48, which, in turn, is rigidly attached to the lower piston mount 42 such that all three components (i.e., the inner rod 16, the inner rod mount 48, and the lower piston mount 42) act as one connected rigid body. Therefore, when the inner rod 16 is pulled upward by the rotation of the adjustment mechanism 58, the lower piston mount 42 also moves upward, relative to the stationary upper piston mount 44, thereby reducing the distance between the two piston mounts. This reduction of distance between the lower piston mount 42 and the upper piston mount 44 forces the deformable elastomer 46 into a state of compression in which it will deform radially outward. The outward radial deformation of the deformable elastomer 46 is the key mechanism by which the damping coefficient of the overall semi-active damper assembly 10 is varied. When compressed, the deformable elastomer 46 reduces the open volume immediately around it, reduces the cross sectional area of the spiraling elastomer fluid channels 52, and, when in compressed to its hardest state, physically engages the inner wall of the shock body 12. All of these results of the compression of the deformable elastomer 46 serve to restrict the travel of damping fluid through and around the semi-active piston assembly 18. Furthermore, when the deformable elastomer 46 is in its most compressed state, the physical pressure which is applied to the inner wall of the shock body 12 serves to generate a large amount of frictional damping, creating a condition of near rigidity throughout the entire semi-active damper assembly 10. In this way, the semi-active damper assembly 10 is able to vary its damping characteristics from a soft baseline level, illustrated in FIG. 2, to a near rigid connection, or infinite damping, illustrated in FIG. 3.

The variable elastomer semi-active damper assembly 10 herein described is intended as an independent unit which may be integrated into the existing control systems of a particular vehicle. The only actuation which the semi-active damper assembly 10 requires is for a signal voltage to be applied to the electric motor 60. Therefore, the semi-active damper assembly 10 is highly adaptable for a variety of control systems. Such a control system may comprise an in-cabin mounted controller which the vehicle operator may actuate to dictate the settings of the semi-active damper assemblies 10. The control system may also receive and process a variety of inputs from a sensor array installed in the vehicle. Such a system would then transmit control signals to the semi-active damper assemblies 10 from a central controller or CPU unit having processed the input data.

An additional item which may be utilized in conjunction with the variable elastomer semi-active damper assembly 10 is a heat transfer system. During vigorous or prolonged operation, the work being constantly performed on the damping fluid may cause it to reach temperatures which are deleterious to performance. To prevent such temperatures, a heat transfer system, as may be purchased or licensed from a plurality of existing suppliers, can be utilized. The heat transfer system may be in the form of finned protrusions extending from outer portions of the semi-active damper assembly 10 which receive considerable heat from the damping fluid, it may be in the form of a fluid heat exchanger, it may be in the form of an air heat exchanger, or it may be in the form of a mixed fluid and air heat exchanger. An example fluid heat exchanger could entail tubing which is wrapped around the shock body 12, having cold fluid pumped through the tubing which absorbs heat from the semi-active damper assembly 10 and transfers it via the fluid to an external location. An example air heat exchanger could be as simple as a duct which blows cold forced air over the semi-active damper assembly 10, transferring the heat in the semi-active damper assembly 10 to the air which may then be exhausted to an external location.

While an exemplary embodiment incorporating the principles of the present invention has been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A variable semi-active damping assembly comprising:
a shock body defining a fluid-filled chamber;
a piston tube having a first end slidably disposed within the shock body;
an inner rod slidably disposed within the piston tube and the shock body, the inner rod having a first end connected to a lower piston mount and a second end extending outward from the piston tube and engaging an adjustment mechanism that is configured to move the inner rod with respect to the shock body;
an upper piston mount slidably disposed within the shock body and connected to the piston tube; and
a deformable member disposed between the lower piston mount and the upper piston mount, the deformable member being configured to transition between a compressed state and a non-compressed state in response to movement by the lower piston mount, further comprising inner fluid channels which permeate through the lower piston mount, the deformable member and the upper piston mount thereby forming an uninterrupted communicative fluid pathway between upper and lower working chambers of the shocking body.

2. A variable semi-active damping assembly, comprising:
- a shock body having a first end and a second end and defining a fluid-filled chamber;
- a piston tube slidably disposed within the shock body;
- a first mounting member connected to the first end of the shock body;
- a second mounting member connected to the second end of the shock body;
- an inner rod slidably disposed within the piston tube and the shock body, the inner rod having a first end connected to a lower piston mount and a second end extending outward from the piston tube and engaging an adjustment mechanism that is configured to move the inner rod with respect to the shock body;
- an upper piston mount slidably disposed within the shock body and connected to the piston tube;
- a deformable elastomer material disposed between the lower piston mount and the upper piston mount, the deformable elastomer material being configured to transition between a compressed state and a non-compressed state in response to movement by the lower piston mount; and
- inner fluid channels which permeate through the lower piston mount, the deformable elastomer material and the upper piston mount thereby forming an uninterrupted communicative fluid pathway between upper and lower working chambers of the shock body.

3. The variable semi-active damping assembly of claim 2, wherein the piston tube passes through a concentric seal that is integrated into the shock body.

4. The variable semi-active damping assembly of claim 2, wherein the inner rod concentrically passes through at least one bearing member or seal member housed within the piston tube.

5. The variable semi-active damping assembly of claim 2, wherein the deformable elastomer material is selected from polyurethane elastomers, polyether elastomers, poly(ether amide) elastomers, polyether polyester elastomers, polyamide-based elastomers, and mixtures thereof.

6. The variable semi-active damping assembly of claim 2, wherein the adjustment mechanism is a threaded tube assembly, a threaded nut assembly or a rack and pinion system.

7. A variable semi-active damping system, comprising:
- a shock body defining a fluid-filled chamber;
- a piston tube having a first end slidably disposed within the shock body;
- an inner rod slidably disposed within the piston tube and the shock body, the inner rod having a first end connected to a lower piston mount and a second end extending outward from the piston tube and engaging an adjustment mechanism that is configured to move the inner rod with respect to the shock body;
- an upper piston mount slidably disposed within the shock body and connected to the piston tube;
- a deformable elastomer material disposed between the lower piston mount and the upper piston mount, the deformable elastomer material being configured to transition between a compressed state and a non-compressed state in response to movement by the lower piston mount;
- inner fluid channels which permeate through the lower piston mount, the deformable elastomer material and the upper piston mount thereby forming an uninterrupted communicative fluid pathway within the fluid-filled chamber of the shock body; and
- an electric motor configured to apply torque to the adjustment mechanism such that it rotates while being held in a constant vertical and horizontal position.

8. The variable semi-active damping system of claim 7, further comprising an in-cabin mounted controller configured to actuate the variable semi-active damping system.

9. The variable semi-active damping system of claim 8, further comprising a control system configured to receive and process a variety of inputs from a sensor array installed in a vehicle.

* * * * *

UNITED STATES PATENT AND TRADEMARK OFFICE
CERTIFICATE OF CORRECTION

| | | |
|---|---|---|
| PATENT NO. | : 8,997,954 B2 | Page 1 of 1 |
| APPLICATION NO. | : 13/086604 | |
| DATED | : April 7, 2015 | |
| INVENTOR(S) | : Phillip D. Rodenbeck | |

It is certified that error appears in the above-identified patent and that said Letters Patent is hereby corrected as shown below:

In the Claims

Column 10, claim 1, line 67, please replace the word "shocking" with the word "shock".

Signed and Sealed this
Twenty-eighth Day of July, 2015

Michelle K. Lee
*Director of the United States Patent and Trademark Office*